Figure 1:
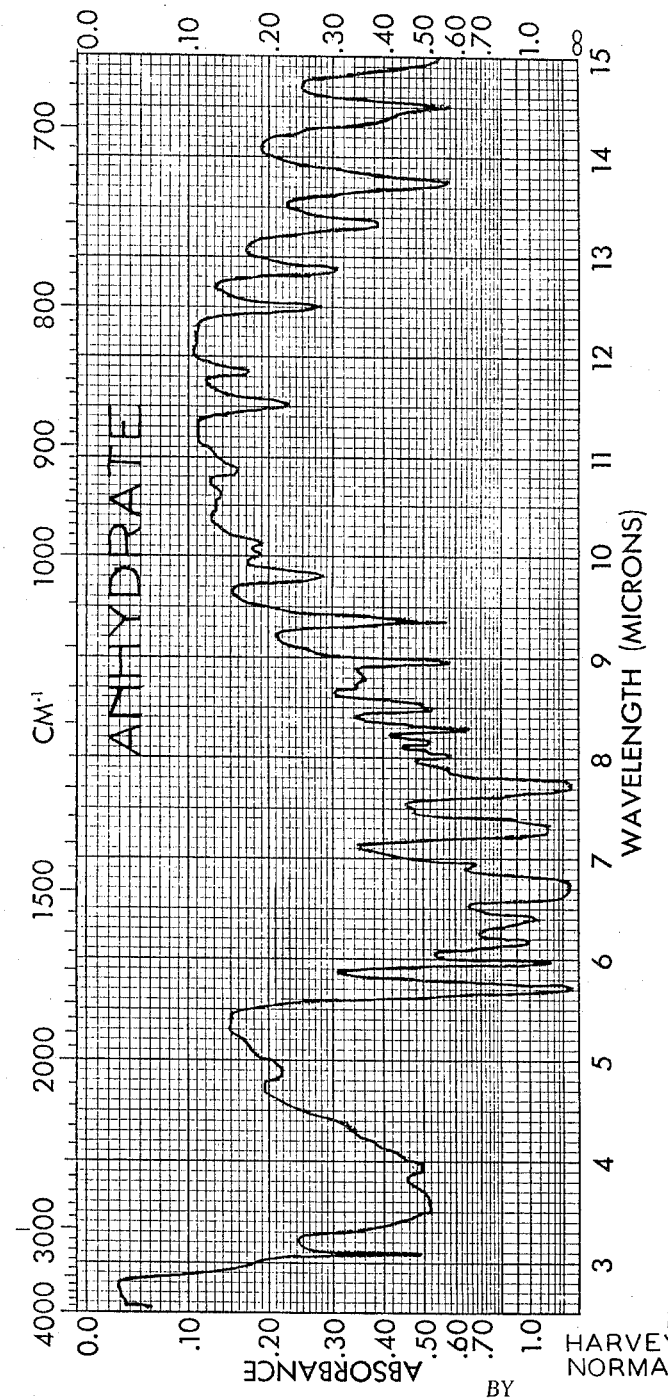

United States Patent Office 3,299,046
Patented Jan. 17, 1967

3,299,046
METHOD OF PREPARING ANHYDROUS AMPICILLIN
Harvey E. Alburn, West Chester, and Norman H. Grant, Wynnewood, Pa., assignors to American Home Products Corporation, New York, N.Y., a corporation of Delaware
Filed June 23, 1964, Ser. No. 377,345
3 Claims. (Cl. 260—239.1)

This invention relates generally to the production of derivatives of penicillanic acids and more particularly to a novel hydrated form of D-6-(2-amino-2-phenyl-acetamido) penicillanic acid and to a novel method for converting said hydrated compound to the anhydrous compound.

The compound D - 6 - (2-amino-2-phenyl-acetamido) penicillanic acid per se, also now known by the generic term "ampicillin," is of proven value in its broad spectrum antibacterial activity and is useful as a therapeutical agent in poultry and in mammals, and particularly in man, in the treatment of infectious diseases caused by Gram-positive and Gram-negative bacteria, upon parenteral or oral administration. It also has use as a nutritional supplement in animal feed.

One hydrated form of D-6-(2-amino-2-phenyl-acetamido) penicillanic acid, i.e., the monohydrate, is already known to the art from the USP 2,985,648, in which a comparatively complex method for the preparation thereof is disclosed.

As disclosed in said USP 2,985,648, ampicillin monohydrate may be prepared by a method generally comprising the reaction of 6-amino penicillanic acid with the α-aminobenzyl acid chloride or anhydride in which the amino group has previously been provided with a protecting acyl group, such as $PhCH_2OCO-$, or some other functionally equivalent protecting group. To recover the desired ampicillin monohydrate, it is then necessary to remove the protecting group by catalytic hydrogenation under sufficiently mild conditions to avoid destruction of the penicillin nucleus. Thereafter it is also necessary to separate the product from the catalyst by filtration and washing. Finally, the aqueous phase is concentrated at low temperatures and pressures.

With respect to the mild conditions stated to be necessary for the method, the patent warns that since some of the antibiotic substances obtained by the process disclosed therein are relatively unstable compounds which readily undergo chemical changes resulting in the loss of antibiotic activity, it is desirable to choose the reaction conditions which are sufficiently moderate to avoid their decomposition. In this connection, it is further stated in the patent that the temperature chosen for the process of preparation of the derivatives of penicillanic acid should not exceed 30° C., and that in many cases a suitable temperature is ambient temperature. Further in this connection, each of the examples disclosed in the patent states the conditions under which recovery of the desired product is obtained is by evaporation in vacuum at a temperature below 20° C. with the exception that D - 6 - (2-amino-2-phenyl-acetamido) penicillanic acid monohydrate may be obtained by evaporation in vacuum at a temperature of 32° C.

Hydrated ampicillin prepared by the foregoing procedures contains from 2.5% to 10% water as determined by the Karl Fischer method. This further indicates that hydrated ampicillin as prepared heretofore has been in the form of the hemihydrate or the monohydrate as referred to in USP 2,995,648, and possibly also as dihydrate.

Figure 2:
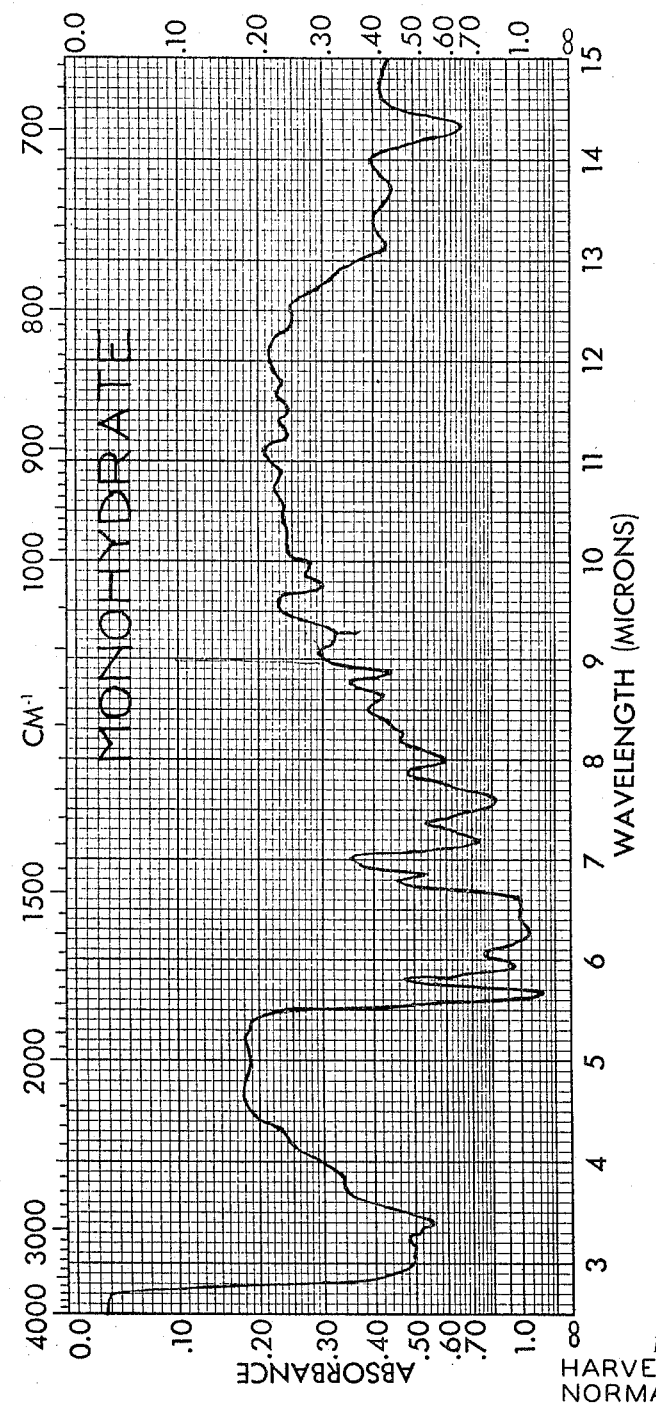

As disclosed and claimed in our copending U.S. patent application Serial No. 247,394 filed December 26, 1962, now U.S. Patent No. 3,144,445, we made the surprising discovery that ampicillin, i.e., D-6-(2-amino-2-phenyl-acetamido) penicillanic acid, may be prepared in a previously unknown anhydrous form which unexpectedly shows highly advantageous storage stability characteristics. The new anhydrous form of ampicillin is characterized by the fact that it has very little, if any, water. It is much less soluble in either water or dimethylsulfoxide than is ampicillin monohydrate. The differing structure of the anhydrous ampicillin form is demonstrated by its infrared spectrograph, an example of which is shown in FIG. 1 of the drawings, when compared with the spectrograph of ampicillin monohydrate, an example of which is shown in FIG. 2. Moreover, X-ray diffraction analyses of single crystals of anhydrous ampicillin have indicated a molecular weight of 347.9 (the theoretical molecular weight of the monomeric anhydrous compound being 349), as compared with the molecular weight of samples of one form of hydrated ampicillin of 367 (precisely the theoretical weight of monohydrate) determined by osmometrical analyses, or 367±7, determined by X-ray diffraction, the range being due to difficulty in growing high quality monohydrate crystals.

The anhydrous ampicillin compound is further distinguished in that it is of greater stability on storage than is hydrated ampicillin. Because of this stability, coupled with its denseness, the efficiency of production of the anhydrous compound in capsule dosage form is increased. As a further advantage, linked to its lesser solubility in water, anhydrous ampicillin exhibits slower absorption in the gut and hence provides prolonged blood levels and more effective action against intestinal pathogens. The foregoing differences and advantages of anhydrous ampicillin over hydrate ampicilin are of enhanced significance, since in utilizing them, therapeutic effectiveness is not at all sacrificed. On the contrary, effectiveness of anhydrous ampicillin is substantially equal to that of hydrated ampicillin on a weight-for-weight basis. For example, when mice were challenged intraperitoneally with a penicillin sensitive strain of S. aureus or a virulent strain of S. typhosa and both types of ampicillin were administered by the oral route to the separately infected mice, equal protection was afforded by each drug.

Further characterization of anhydrous ampicillin, including its storage stability under varying conditions of temperature, humidity and time; its antibiotic utility in human therapy; and its lack of affinity for water, and other properties; is set forth in the aforesaid copending application U.S. Serial No. 247,394 now U.S. Patent No. 3,144,445.

As disclosed in said application, the method for preparing the novel compound anhydrous ampicillin when the precursor is ampicillin monohydrate, comprises heating the hydrate in the presence of free water at a temperature of from 40° to about 100° C., until the anhydrous ampicillin crystals are formed. The heating may best be carried out with the charge of hydrated ampicillin crystals plus water at a pH of from about 3.0 to 7.0. Preferably the free water is present in amount that is at least 50% by weight of the charge, and the heating is applied to the charge under vacuum until the dry anhydrous ampicillin product is obtained. In an alternative procedure, the required heat and water may be supplied by directly steaming crystals of ampicillin monohydrate. It has been found most advantageous from the standpoint of feasibility and of economic processing to carry on the drying operation at a pH of from 5.0 to 5.5 and at a temperature within the range of 50°–55° C.

The foregoing method has been found to be admirably suitable for preparing the highly desirable anhydrous ampicillin product when ampicillin monohydrate is the precursor. Good results are also obtainable when the precursor comprises the hemihydrate and/or the dihydrate of ampicillin.

Figure 3:
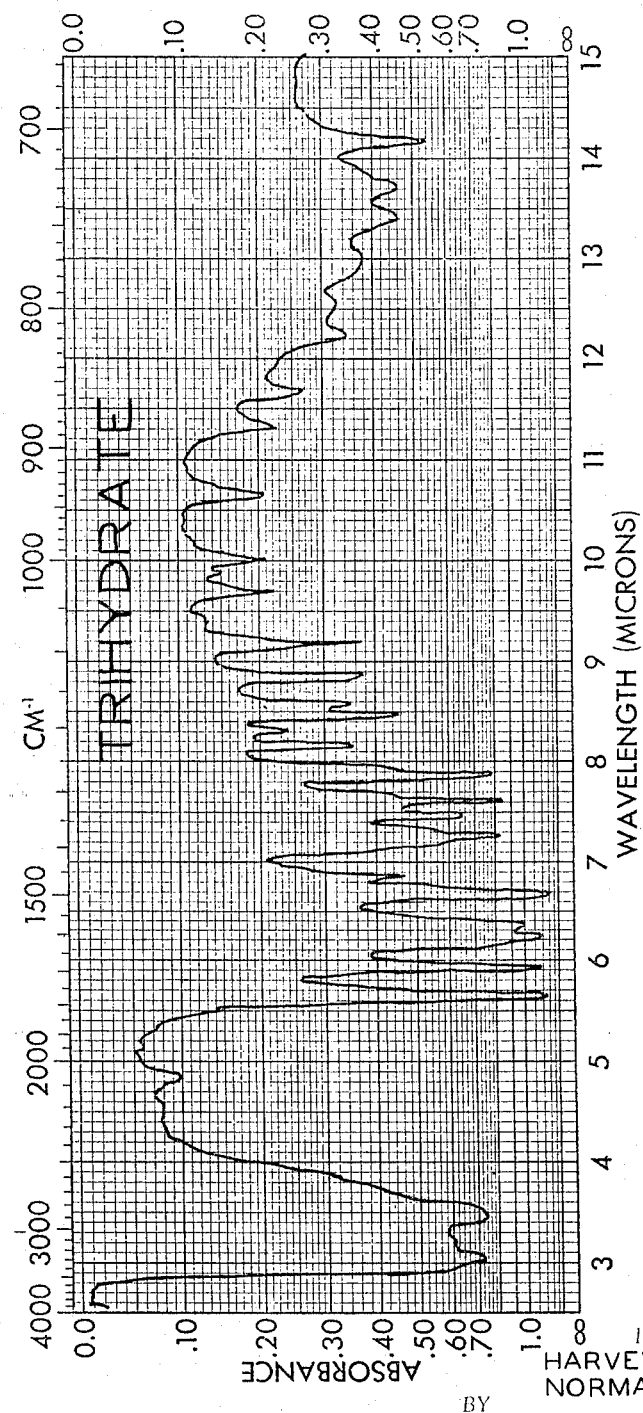

We have since discovered that ampicillin may also be produced in crystalline form as the trihydrate. This form of ampicillin is characterized by containing about 13.4% bound water although in some instances this form of the trihydrate has been found to have a bound water content as low as about 12% and as high as about 15%. Because it is a different entity, the trihydrate has been found to have a distinctive infrared spectrograph, which, as shown in FIG. 3 of the drawings, is different from the infrared spectrographs of anhydrous ampicillin and ampicillin monohydrate which are respectively disclosed in FIGS. 1 and 2 of the drawings. The trihydrate, moreover, has a molecular weight of about 403, as determined by X-ray diffraction analysis, in comparison to the molecular weights of about 349 and about 367 for the anhydrous and monohydrate forms of ampicillin, respectively. Another distinctive characteristic of this new form of ampicillin is that it has been found to be less soluble in water than is the monohydrate. Accordingly, there is an inherent practical advantage in its production from a reaction mixture in that its isolation from an aqueous medium is facilitated.

However, it has been found, unexpectedly, that the method referred to previously for converting ampicillin monohydrate to anhydrous ampicillin is not effective, under comparative conditions, for converting the newly discovered ampicillin trihydrate to anhydrous ampicillin. For example, when a 20% suspension of ampicillin trihydrate in water is heated for 30 minutes at 55° C., and the product is dried, it is still the trihydrate. Even at 90° C., the trihydrate, when suspended in water at pH's of from 5.5 to 7.0, is not converted to the anhydrous form. In 20 and 30% suspensions of the trihydrate, dried at 100° for 1 hour, the new compound has surprisingly been converted to atypical forms of the monohydrate with 4–5% water, and not to the anhydrous form.

In consideration of the foregoing, we have discovered that the aqueous environment essential to the method of obtaining anhydrous ampicillin from the previously known hydrated forms of ampicillin, should, when the trihydrate is utilized as precursor, contain an organic solvent, which is preferably entirely miscible with water, or partially miscible with water at least to the extent that the organic solvent will retain 5% by volume of water in solution. For example, acetone, ethanol, isopropanol, n-propanol, n-butanol, ethylene glycol, ethylene glycol monomethyl ether, and dioxane, which meet the aforesaid requirements with respect to miscibility with water, have been found to be eminently suitable for use as the requisite organic solvent, and, in certain instances, even when included in proportions up to about 95% of the aqueous environment. However, with respect to the last, it has been found that the total water present in the processing mixture containing the trihydrate crystals and furnished as both free and chemically bound water, must constitute at least about 10% by weight based on solids and total water present to obtain the desired conversion to the anhydrate. On the other hand, when the organic solvent is present in the environment in concentrations of less than 20% by volume of said environment, the salutary effect of the solvent for permitting transformation of the trihydrate to the desired anhydrous form is not in evidence.

The surprising nature of the novel method of the invention for converting ampicillin trihydrates to anhydrous ampicillin is demonstrated by the fact that such other common organic solvents as n-amyl alcohol, n-hexyl alcohol, methyl isobutyl ketone, methyl amyl alcohol, and butyl acetate which do not meet the stated criteria with respect to miscibility with water, have not been found suitable for the same purpose, although the ultimate reason for such selectivity in the matter of operability is obscure.

When an organic solvent of suitable water miscibility is selected, and sufficient water is totally available in the bound and free state, as referred to above; it has been found that the conversion of the trihydrate to the anhydrous form of ampicillin may be carried out within the broad pH range of from about 2.0 to about 8.0 (provided there is sufficient water present to render a pH determination possible). Optimum conversion yields appear to occur when the pH is maintained within the higher portion of the range, although control of the pH is not absolutely necessary to operability of the method, other than, at a higher pH than 8.0, destruction of the penicillin nucleus tends to occur. Conversion itself is caused to occur by maintaining the organic solvent, water and crystalline ampicillin trihydrate systems described, within the temperature range of from about 50° C. to about 100° C.

Generally, the new precursor (i.e., the trihydrate of ampicillin) of the desired anhydrous form of ampicillin, may be prepared by admixing 6-amino penicillanic acid and D-phenylglycine N-carboxy anhydride in a weight ratio of about 10 to 4.5 with about 100 to 150 parts by weight of water, adjusting the pH of the aqueous system to within a preferred pH range of from about 4.8 to about 6.0 pH by addition of an alkaline material, e.g., NaOH, and thereafter concentrating the reaction mixture under vacuum to remove water. The resulting precipitate may then be removed and the filtrate passed through an anion exchange resin to separate excess 6-amino penicillanic acid. Finally, the ampicillin-containing effluent may be concentrated under vacuum until crystals of the trihydrate form. The trihydrate crystals may then be filtered off, and in accordance with well known recovery procedures, the concentration-filtration cycle may be continued until ampicillin no longer precipitates from the filtrate.

Specific modes for preparing ampicillin trihydrate and transforming this compound to the anhydrate are given in Examples I and II below:

*Example I*

A mixture of 800 grams of 6-aminopenicillanic acid (6–APA) and 100 liters of water is adjusted to pH 5.0 with 10 N NaOH. During vigorous stirring, 325 grams of D-phenylglycine-N-carboxyanhydride is added. After 1 hour the reaction mixture is concentrated under vacuum to 20 liters. The resulting precipitate is removed, and the filtrate is passed through an anion exchange resin to separate excess 6–APA. The ampicillin-containing effluent is concentrated under vacuum until a heavy crop of crystals forms. This is filtered off, and the concentration-filtration cycle continued until ampicillin no longer precipitates. The filter cakes are washed with 3 volumes of 85% isopropanol and, finally, slurried with one volume of 85% isopropanol without draining, and dried at 80°. The product is ampicillin anhydrate, weighing 305 grams.

*Example II*

A mixture of 1600 grams of 6-aminopenicillanic acid (6–APA) and 200 liters of water is adjusted to pH 5.0 with 10 N NaOH. During vigorous stirring, 650 grams of D-phenylglycine-N-carboxyanhydride is added. After 1 hour the reaction mixture is concentrated under vacuum to 40 liters. The precipitate is removed, and the filtrate is passed through an anion exchange resin to separate excess 6–APA. The effluent is concentrated under vacuum until a heavy crop of ampicillin trihydrate crystals forms. This is filtered off, and the process is repeated until ampicillin no longer precipitates. The filter cakes are washed with half volumes of ice-cold distilled water, and the product is dried at 20–25° under vacuum. The yield is 640 grams of 93% pure ampicillin, calculated as the anhydrate. The trihydrate is converted to the anhydrate by refluxing a 15% suspension in 85% isopropanol for 20 minutes, filtering, and drying at 50° in a Stokes oven.

The following are examples of conversions of ampicillin trihydrate to the anhydrous form of ampicillin utilizing various solvents, concentartions, and temperatures in accordance with the invention.

*Example III*

Suspend separate batches of 10 grams of ampicillin trihydrate in 100 ml. of various mixtures of water and organic solvent, as set forth in Table A below, and, under atmospheric conditions, heat each mixture at the temperature also designated in said table, to obtain anhydrous ampicillin in each case.

TABLE A

| Organic Solvent | Concentration of Solvent, Percent | Temperature, degrees |
|---|---|---|
| Acetone | 75 | 85 |
| Do | 50 | 85 |
| Do | 50 | 50 |
| Do | 75 | 50 |
| Ethanol | 50 | 85 |
| Dioxane | 75 | 85 |
| Do | 60 | 69 |
| Ethanol | 60 | 71 |
| Do | 75 | 60 |
| Ethylene glycol | 75 | 71 |
| Do | 75 | 85 |
| Ethylene glycol monomethyl ether | 75 | 85 |
| Isopropanol | 75 | 70 |
| Do | 75 | 85 |
| Do | 90 | 80 |
| Do | 94 | 85 |
| n-Propanol | 60 | 80 |
| Do | 75 | 71 |
| Do | 75 | 85 |
| n-Butanol | 85 | 85 |

*Example IV*

Pump 85 liters of 99% isopropanol into a 50 gallon stainless steel kettle. Add 15 litters of tap water. Start the stirrer of the kettle, open the manhole, and warm the contents of the kettle to 80°. At 80°, with the stirrer in operation, add 14.58 kg. of ampicillin trihydrate at a rate of about 1.5 kg. per minute. Close the manhole and raise the temperature until refluxing is observed (at a temperature reading of about 80° to 85° C.). Reflux the system for 20 minutes at which time stop the heating, continue the stirring and open the bottom valve of the kettle to release the contents to a 20 inch stainless steel table top Buchner with a canvas pad. Filter the suspension.

Wash the filter cake with 20 liters of 85% isoproppanol, dry at 48° in a Stokes oven for 2 days, and then mill. The product, weighing 10.7 kg., has the following characteristics:

| | |
|---|---|
| Hydroxymate assay (percent) | 93.2 |
| Moisture (K–F, percent) | 1.5 |
| Optical rotation $(\alpha)_D^{25}$ (degrees) | +269 |
| Form indicated by IR spectrum | Anhydrate |
| Yield of activity (percent) | 87 |
| Appearance | Fine powder |
| Color | Off-white |
| Odor | None |

We claim:

1. The method of preparing the substantially anhydrous crystalline form of D-6-(2-amino-2-phenyl-acetamido) penicillanic acid, which method comprises:
   (A) preparing a mixture comprising (1) the crystalline trihydrated form of D-6-(2-amino-2-phenyl-acetamido) penicillanic acid and (2) a reaction medium comprising, (a) a water-miscible organic solvent capable of dissolving at least 5% by volume thereof of water, and present in amount that is at least 20% by volume of said medium, and (b) sufficient free water to bring the total amount of bound and free water in the mixture to at least 10% by weight based on solids and total water present;
   (B) heating said mixture to a temperature of from about 50° C. to about 100° C.; and
   (C) drying the mixture to obtain crystals of the substantially anhydrous form of D-6-(2-amino-2-phenyl-acetamido) penicillanic acid.

2. The method of preparing the substantially anhydrous crystalline form of D-6-(2-amino-2-phenyl-acetamido) penicillanic acid as defined in claim 1 wherein said water-miscible organic solvent comprises from about 50% to about 95% by volume of said medium and said heating occurs in the temperature range of from about 60° C. to about 85° C.

3. The method of preparing the substantially anhydrous crystalline form of D-6-(2-amino-2-phenyl-acetamido) penicillanic acid as defined in claim 1 wherein said water-miscible solvent is isopropanol which comprises about 85% by volume of said medium and said heating occurs in the temperature range of from about 80° C. to about 85° C.

References Cited by the Examiner

UNITED STATES PATENTS

| 2,985,648 | 5/1961 | Doyle et al. | 260—239.1 |
| 3,144,445 | 8/1964 | Grant et al. | 260—239.1 |
| 3,157,640 | 11/1964 | Johnson et al. | 260—239.1 |
| 3,180,862 | 4/1965 | Siluestri et al. | 260—239.1 |

ALEX MAZEL, *Primary Examiner.*

HENRY R. JILES, *Examiner.*

J. W. ADAMS, *Assistant Examiner.*